United States Patent [19]
Edrey

[11] Patent Number: 5,881,276
[45] Date of Patent: Mar. 9, 1999

[54] MANIPULATION OF PROTECTED PAGES TO REDUCE CONDITIONAL STATEMENTS

[75] Inventor: Ayelet Edrey, Haifa, Israel

[73] Assignee: Intel Corporation, Santa Clara, Calif.

[21] Appl. No.: 688,653

[22] Filed: Jul. 30, 1996

[51] Int. Cl.$^6$ .............................. G06F 9/00; G06F 9/44
[52] U.S. Cl. ..................... 395/581; 395/585; 395/705
[58] Field of Search ............................. 395/183.14, 375, 395/391, 416, 490, 582, 585, 705, 709, 800, 580, 581; 711/213

[56] References Cited

U.S. PATENT DOCUMENTS

| | | | |
|---|---|---|---|
| 5,148,531 | 9/1992 | Shiraishi | 395/375 |
| 5,509,131 | 4/1996 | Smith et al. | 395/416 |
| 5,559,992 | 9/1996 | Stutz et al. | 395/490 |
| 5,581,696 | 12/1996 | Kolawa et al. | 395/183.14 |
| 5,613,118 | 3/1997 | Heisch et al. | 395/709 |
| 5,615,386 | 3/1997 | Amerson et al. | 395/585 |
| 5,721,937 | 2/1998 | Baraz et al. | 395/705 |
| 5,748,976 | 5/1998 | Taylor | 395/800 |

*Primary Examiner*—Robert W. Downs
*Assistant Examiner*—Anthony Nguyen-Ba
*Attorney, Agent, or Firm*—Blakely, Sokoloff, Tayor & Zafman LLP

[57] ABSTRACT

A method and apparatus to reduce conditional statements in normal code flow. A plurality of contiguous memory pages are allocated as either protected or unprotected. A pointer is defined to point to an address such that an operation (write or read) to an address in the unprotected page will occur when the conditional value is within an accepted range. The address is calculated by using a function of the conditional value as an offset to the pointer. When the conditional value enters the non-accepted or error range, the operation to the address of the pointer offset by the function of conditional value will fall within the allocated protected page. This will result in a faulting pointer and invocation of a signal handler which is independent of the normal code and only executed responsive to the conditional value entering an error range.

13 Claims, 6 Drawing Sheets

Original Code:

```
void func (unsigned int x)
{
        if (x > 3)
        {
                /*error code      */
                /*:            */
                /*:            */
        }
        else
        {
        /* normal code   */
        /* :            */
        /* :            */
        }
}
```

Fig. 1a
(Prior Art)

Correlating pseudo assembly code:

```
func:
        cmp x, 3
        jmp.le else_part  // performance costing jump if mis-predicted
        // error code
        // :
        // :
else_part:
        // normal code
        // :
        //:
```

Suggested code:

```
signal_handler (char *faulting pointer)
{
        if ((faulting_pointer > prot_mem_start) && (faulting_pointer < prot_mem_end))
        {
                /* error code     */
                /* :              */
                /* :              */
        }
        else
        {
                call_default_signal_handler (faulting_pointer);
        }
} void func (unsigned int x)
{
        *(x+prot_ptr) = 0 /* store a value to the address (prot_ptr + x) i.e. (prot_mem_start - 3 + x) */
                /* normal code   */
                /* : */
                /* : */
}
```

Fig. 5

```
void add_element (char val)

{
        if (head == 100)
        {
                head = 0;
        }
        buf[head] = val;
        head = head + 1;
        update_tail_value ();
}
```

Fig. 6a
(Prior Art)

```
void add_element (char val)
{
        buf[head] = val;
        head = head + 1;
        update_tail_value();
} sig_handler(reg_values)
{
        if (faulting_ptr > prot_mem_first && faulting_ptr < prot_mem_last)
        {
                head = 0;
                return_to_faulting_sequence(reg_values);
        }
        else
        {
                call_default_signal_handler (faulting_pointer);
        }
}
```

Fig. 6b
(Prior Art)

MANIPULATION OF PROTECTED PAGES TO REDUCE CONDITIONAL STATEMENTS

BACKGROUND OF THE INVENTION

(1) Field of the Invention

The invention relates to improving efficiency in computer systems, reducing the use of conditional statements. More specifically, the invention relates to manipulation of protected and unprotected pages to eliminate the need for conditional statements in cases in which one branch of the conditional is rarely or never taken.

(2) Related Art

In many common computer systems, memory is organized into pages. Page protection is common in existing virtual memory systems. Physical memory is divided into pages and allocated among different processes. From the prospective of a process, any particular page can be allocated as unprotected or protected. An unprotected page allows the process to read or write to any address on the page. Among the possible protection schemes are read protection and write protection. As the names imply, a write protected page may be read by the process, but not written to or modified in any way. A read protected page could be written to, but not read. Generally, there is little reason to allow a page to be written but not read. A page that is both read and write protected cannot be either read from or written to by the process. Allocating pages between these levels of protection is well known in the art Many systems support signal handlers which are code segments executed by the system in response to receipt of an interrupt or exception signal. Such systems provide default signal handlers, but also provide support for replacement of the default signal handler with a user-defined signal handler. Accordingly, custom signal handlers are known in the art.

Two common programming constructs are pointers and conditional statements. A pointer is a variable defined to be an address at which some data resides rather than the data itself. This allows the data associated with the variable to be changed by writing to the address rather than redefining the variable. Defining pointers is well understood in the art.

Conditional statements have been a mainstay of computer programming since its inception. Conditional statements typically involve three parts: the comparison part, the "then part," and the "else part. " The comparison part is always executed, but only one of the "then" and "else" parts is executed. This forces a branch over some part of the code. If the branch is mispredicted, the result is a flush of the pipeline's contents and the corresponding performance loss. Accordingly, branches are performance expensive, and it is desirable to avoid them when possible. A branch target buffer (BTB) has commonly been employed to help reduce this performance loss. However, as a branch target buffer compares the program counter of a previous execution of the conditional statement and the corresponding result, where the code is replicated several times, the BTB will fail to yield the desired performance improvement. Moreover, when a BTB is confronted with a conditional statement executed many times in different code segments, the BTB can become full as it is basically a table of limited size. Once the BTB is full, each new entry replaces an old entry, thus, possibly deleting an entry that would otherwise be used later. Minimizing the number of conditional statements in the code reduces the likelihood that any needed entry will have been displaced from the BTB.

Figure 1A:
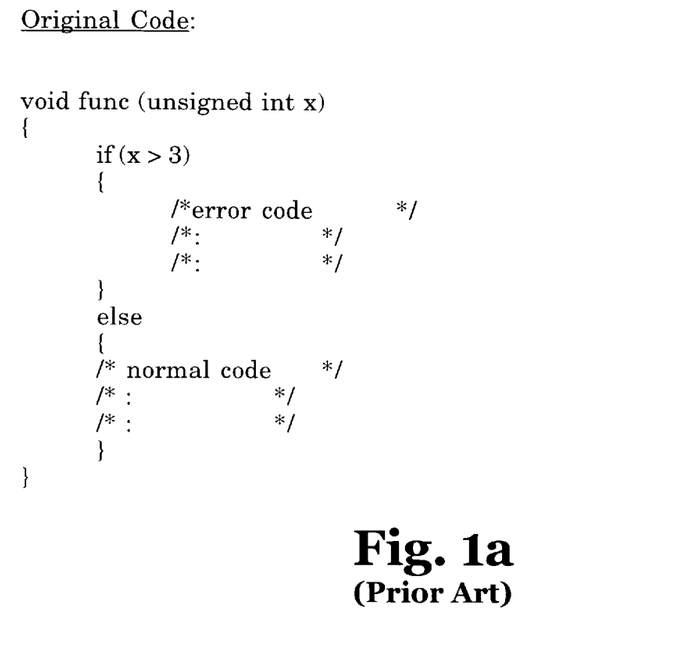
FIG. 1a shows a typical prior art high-level coding of a conditional statement.
Figure 1B:
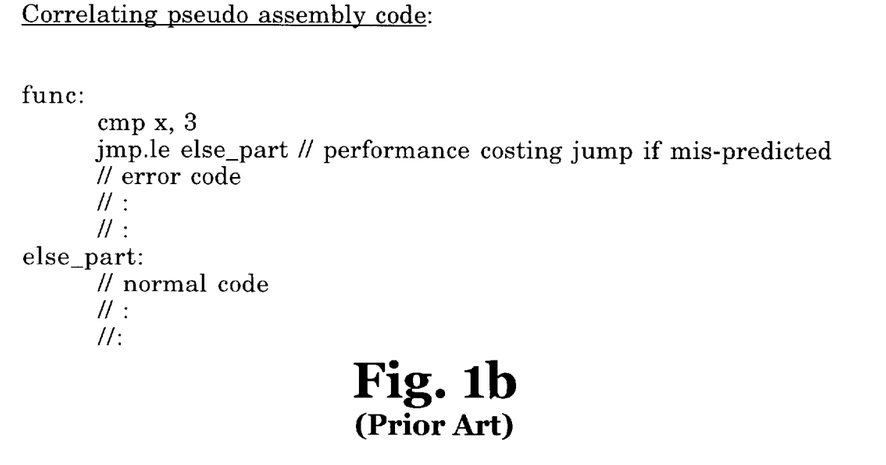

Some conditional statements (or code sequence) are designed to distinguish between a legal or normal occurrence which occurs very frequently, and an illegal or error occurrence which occurs very rarely. FIGS. 1a and 1b show such a conditional statement. FIG. 1a shows a function written in a high level language in which the variable "x" is greater than 3 implies an error has occurred. As long as "x" is not greater than 3, the normal code should be executed sequentially. FIG. 1b shows the assembly code corresponding to the high level code of FIG. 1a The variable "x" is initially compared with 3. A jump in the normal code occurs unless "x" is greater than 3. Here if, for example, the branch prediction assumes not taken, anytime "x" is in the normal range, the branch will be mispredicted and a performance deteriorating pipeline flush will be required. As discussed above, a BTB could remedy this problem, if this were a single code section executed repeatedly. However, where the code segment occurs many times, with no particular conditional statement executed more than once, a BTB fails to improve the performance.

It would be desirable to have a method and apparatus for distinguishing between legal and illegal values without introducing conditional statements into the coding.

SUMMARY OF THE INVENTION

A method and apparatus to reduce conditional statements in normal code flow is disclosed. A plurality of contiguous memory pages are allocated as either protected or unprotected. A pointer is defined to point to an address such that an operation (e.g., write or read) to an address in the unprotected page will occur when the conditional value is within an accepted range. Thus, a memory access replaces a conditional statement that would otherwise be needed.

In one embodiment, the address for the operation is calculated by using a function of the conditional value as an offset to the pointer. When the conditional value enters the non-accepted or error range, the operation to the address of the pointer offset by the function of conditional value will fall within the allocated protected page. This results in a faulting pointer and invocation of a signal handler which is independent of the normal code and only executed responsive to the conditional value entering an error range.

In another embodiment, the protected page is write protected and the operation is a write. Assuming, for example, that the accepted range of the conditional value x is less than or equal to 3, the pointer is defined to point to an address in the unprotected page four address numerically below the start of the protected page (i.e., pointer+4= protected page starting address). Thus, while x is less than 4, writes to pointer+x will simply write a value to the corresponding address in the unprotected page and the next sequential instruction moves through the pipeline without interruption or the possibility of a branch. When x exceeds 3, a write is attempted to the protected page. This write causes a pointer fault in response to which the signal handler is invoked and the alternate code which would correspond to the unused "then" or "else" part in the traditional conditional statement is executed. Thus, this normally unused code is excised from the normal code flow.

BRIEF DESCRIPTION OF THE DRAWINGS

FIG. 1b shows assembly code corresponding to the high-level code of FIG. 1a.

DETAILED DESCRIPTION OF THE INVENTION

Figure 2:
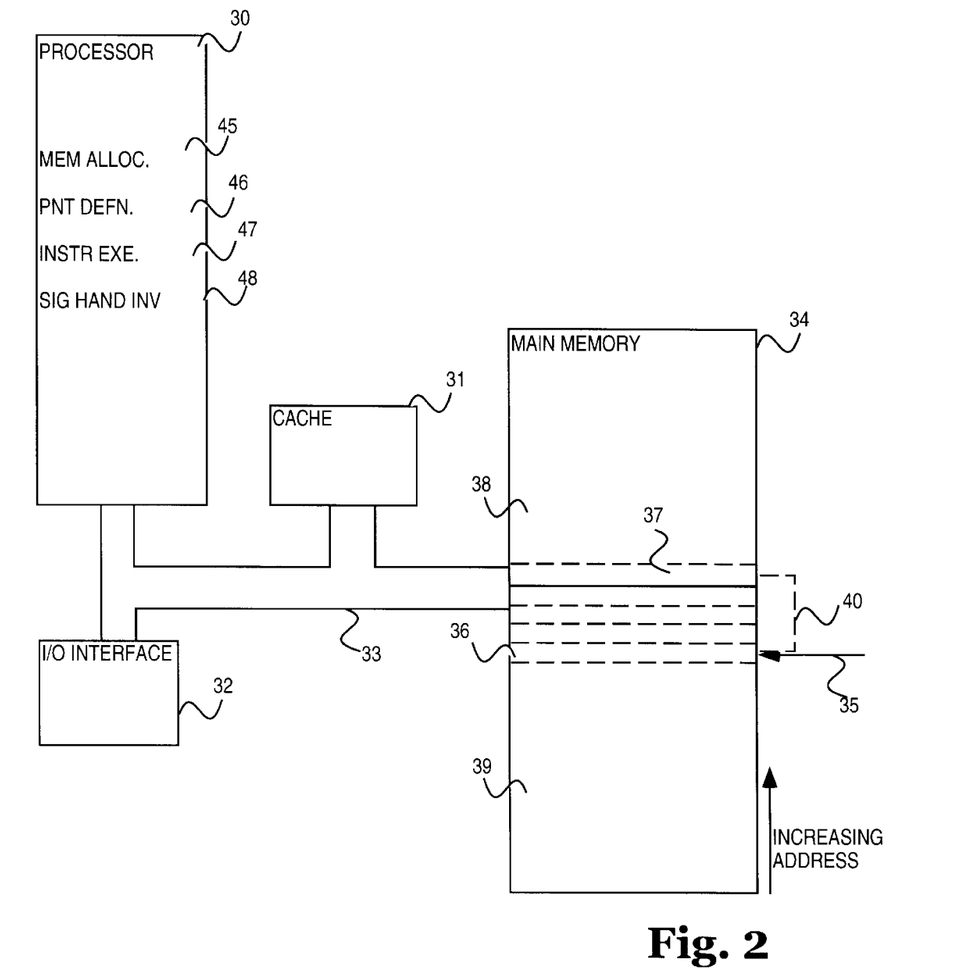
FIG. 2 shows a block diagram of one embodiment of the present invention.

FIG. 2 shows a block diagram of one embodiment of the present invention. A processor 30 is coupled to a bus 33. Cache 31 is coupled to the bus 33. Input/output devices (not shown) may communicate with the bus 33 via I/O interface 32. The processor 30 supports functionality for memory allocation 45, pointer definition 46, memory transaction execution 47, and signal handler invocation 48. The allocation functionality 45 allows pages of memory to be allocated as protected or unprotected. The pointer defining functionality 46 allows a pointer to be defined at a memory location. The memory transaction execution functionality 47 allows for memory transactions between the processor 30 and the main memory 34. The signal handler invocation functionality 48 permits invocation of a signal handler responsive to a predetermined condition. These functionalities may be implemented with dedicated circuitry or software.

Main memory 34 is also coupled to the bus 33. In FIG. 2, two pages of main memory 34 are shown: protected page 38 and unprotected page 39. (It is readily understood by one of ordinary skill in the art that main memory 34 could be composed of any number of contiguous pages, some of which are protected and some of which are non-protected). A pointer 35 is defined to point to address location 36 on unprotected page 39. Protected address location 37 is the first address on the protected page 38. Pointer 35 is defined to be at critical distance 40 from protected page 38. Protected page 38 contains first protected address 37. The critical distance 40 is related to the normal range of the conditional value of a conditional statement to be replaced by a function f(x). By appropriately defining the pointer and the protected and unprotected pages, it is possible to eliminate some conditional statements within the code of some applications. The function f(x) should be selected such that as the pointer and protected and unprotected pages are defined for any likely value of x, pointer+f(x) will fall within the protected or unprotected pages. Here, critical distance 40 is shown as three units. Whether the three units comprise three bytes, three words, three long words, etc., is determined by the definition of the pointer 35. The units should be selected consistent with the pointer type. It is also important that the function f(x) accounts for the unit size. For example, because pointer+f(x) is actually implemented as pointer+(f(x) * size of pointed unit), if the pointer points to a byte, pointer+f(x) is equal to pointer+f(x), while if the pointer points to a word, the pointer+f(x) is equal to pointer+ 2f(x). Thus, assuming a single unprotected four kilo byte page, the range of f(x) for a byte pointer is 4K, while the range of f(x) for a word pointer is only 2K.

To eliminate a conditional statement according to one embodiment of the invention, unprotected page 39 and protected page 38 are appropriately allocated pages in main memory 34 and pointer 35 is appropriately defined to be a critical distance 40 from the protected page. Instead of a conditional statement, the program executes an operation (typically either a read or a write) to the address indicated by the pointer, offset by a function of a conditional value.

A function should be chosen for which calculation time does not slow the overall system significantly. In one embodiment, the function is f(x)=x. This function is suitable where as here the possible legal and illegal range of x is small. In the example of FIGS. 1a and 1b, defining a pointer to point to an address three addresses lower than the start of the protected page and using x as an offset to the pointer will result in an operation on a protected address when x is greater than 3.

Figure 3:
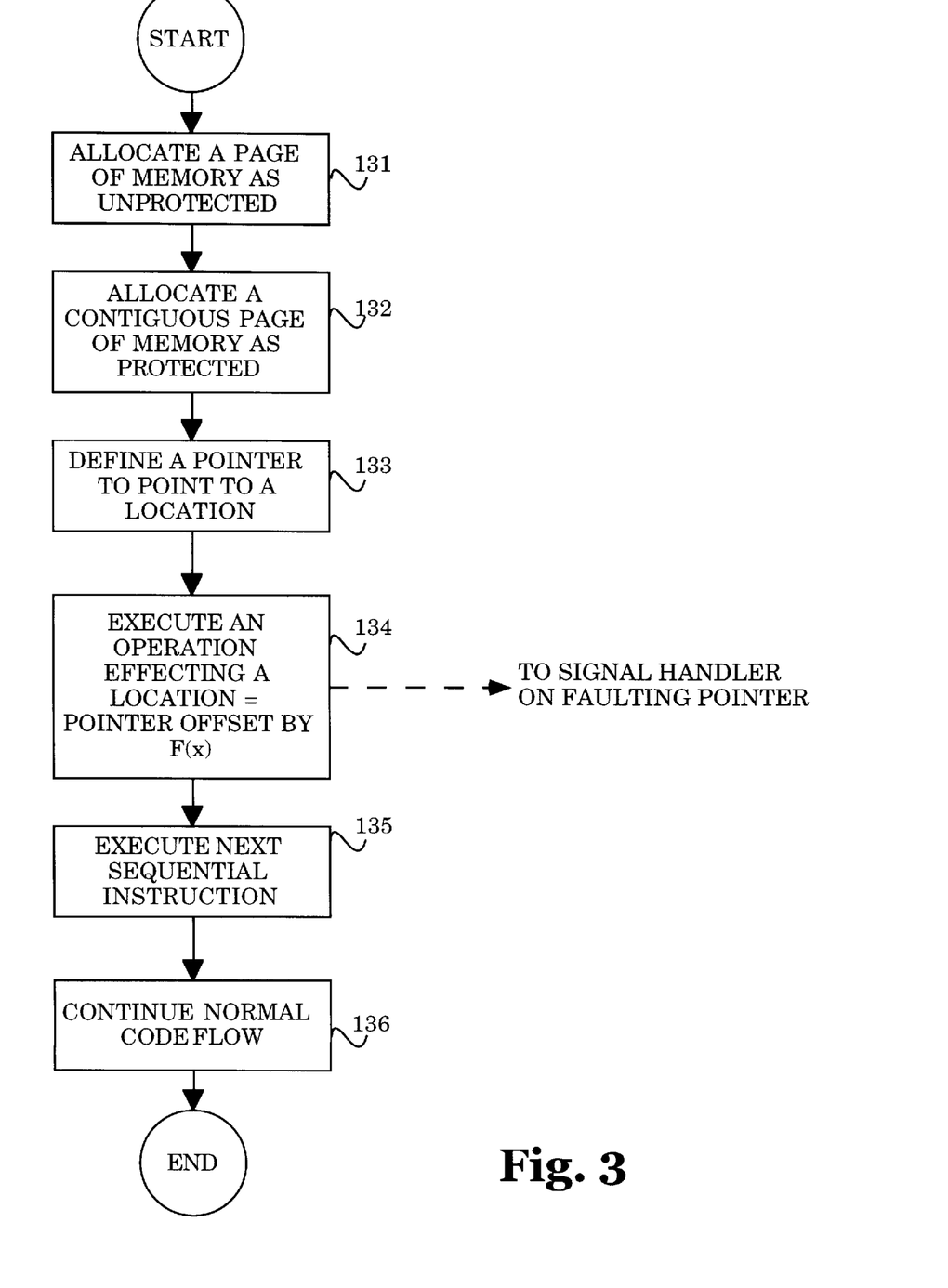
FIG. 3 shows a flowchart of normal code flow in one embodiment of the invention.

FIG. 3 is the flowchart of code flow in one embodiment of the instant invention. At functional block 131, a page of unprotected memory is allocated. At functional block 132, a contiguous page of protected memory is allocated. At the functional block 133, a pointer is defined to point to a location either in the protected or unprotected page of memory. Determination of where the pointer should be defined to point is discussed in more detail above in connection with FIG. 2.

At functional block 134, an operation is performed (e.g., a read or a write) to a memory location equal to the pointer offset by a functional f(x). If this address falls within the protected page, the signal handler will be invoked as a result of the faulting pointer. Otherwise, execution of the next sequential instruction will occur at functional block 135. The normal code flow continues at functional block 136.

Figure 4:
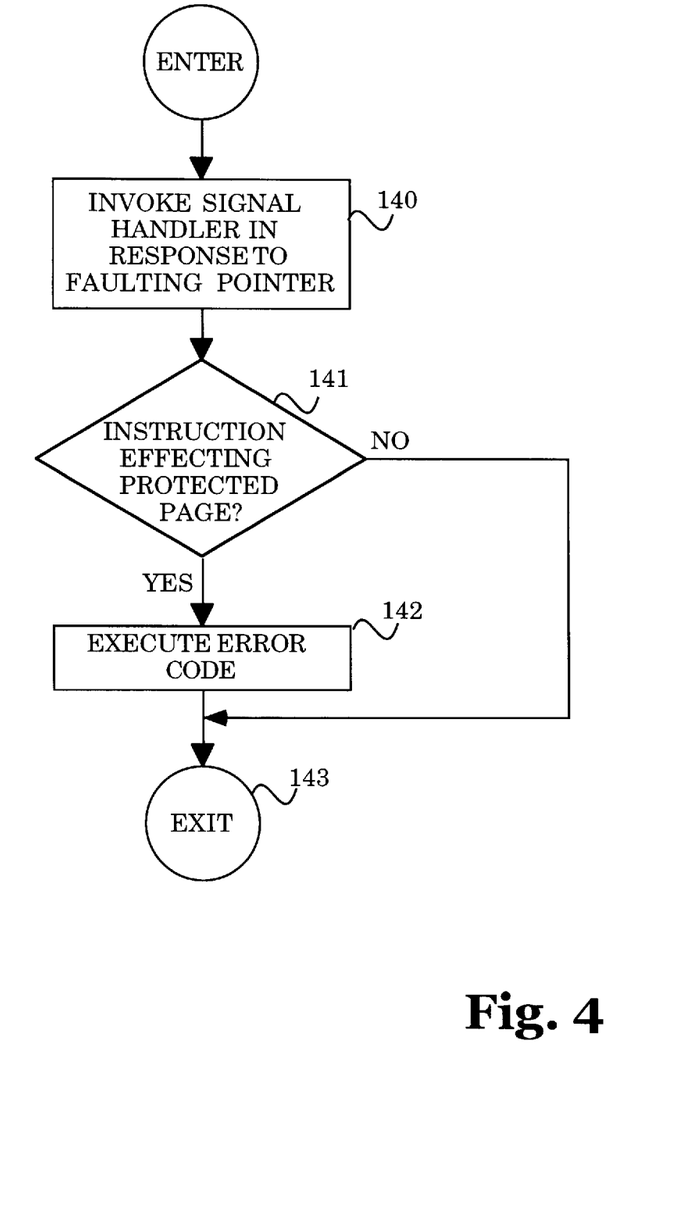
FIG. 4 shows a flowchart of flow in response to the conditional value being out of range in one embodiment of the invention.

FIG. 4 shows a response to a faulting pointer at functional block 134 of FIG. 3. At functional block 140, the signal handler is invoked responsive to the faulting pointer. A check is made at decision block 141, to determine if the faulting pointer and the result of the instruction effecting the protected page. If it is not, the default signal handler is called at functional block 144. The actions performed by the default signal handler will vary from system to system and are not part of the instant invention. If the fault was caused by the instruction effecting the protected page, the signal handler executes the appropriate error or exception code at functional block 142. Once functional block 142 has executed the error code, the signal handler exits at 143. Exit 143 can take one of three forms: 1) the signal handler can return to the function that causes signal handler execution and re-execute the faulting sequence; 2) the signal handler can return to the function that causes signal handler execution to the instruction following the faulting instruction; or 3) don't return to the function that caused signal handler execution. These various alternatives will be dependent on the type of rare case identified by the fault. The first and second options above are used when the faulting function still has relevant code to execute. This implies that the rare case that is dealt with in the signal handler has some more relevant code remaining in the function. A third option is used when the signal handler is generating an error and the remaining code of the function that caused the error is no longer relevant. Use of the first option is discussed more below in connection with FIG. 6b.

Figure 5:
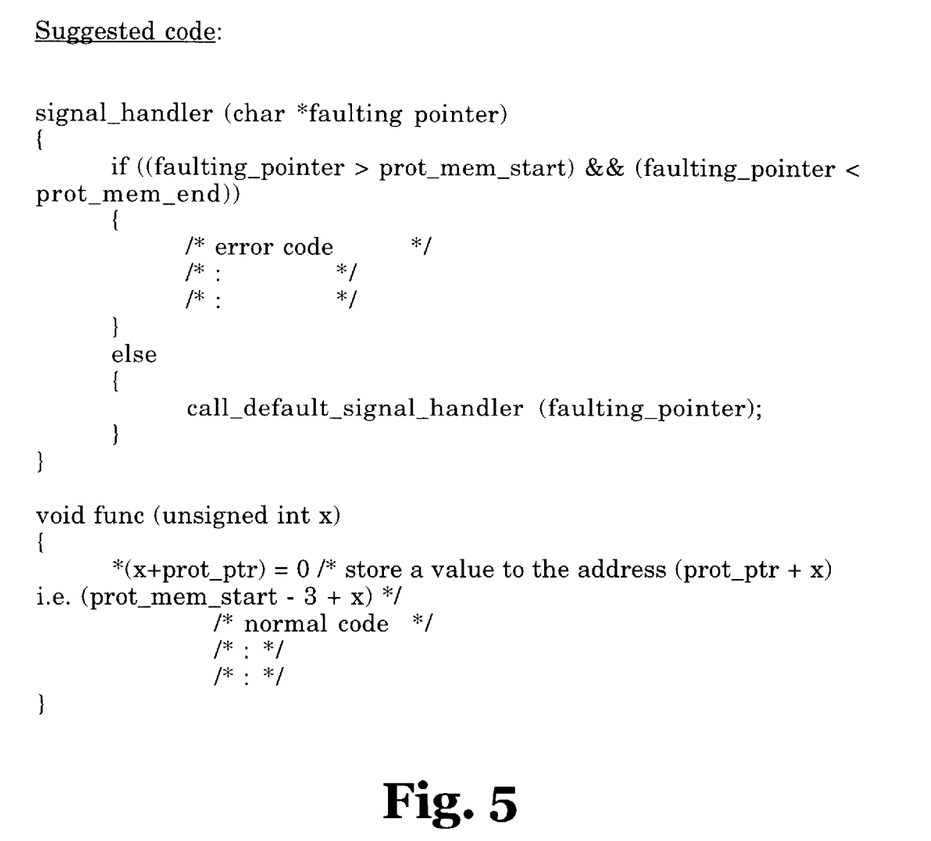
FIG. 5 shows coding which removes a conditional statement from normal program flow in accordance with one embodiment of the invention.

FIG. 5 shows the recoding of the conditional statement previously discussed. Instead of a conditional statement, an operation (read or write) is performed on an address equal to the pointer offset by the conditional value. Thus, when x moves outside the normal range, the operation attempts to effect a protected address. When the operation attempts to effect a protected address within the protected page, the pointer will fault and a signal handler is invoked in response to the faulting pointer. Otherwise, normal operation continues with the execution of subsequent sequential instructions, and there is no branch misprediction penalty.

The signal handler is not within the normal flow of the code and may occupy an entirely separate section of memory. The signal handler operates much like an interrupt service routine and is only executed if specifically invoked. For example, assuming the protected page is write protected and the variable x is within the error range (e.g., x=4), a write to pointer+x will attempt to write to the first address of the protected page. The resulting pointer fault will cause the invocation of the signal handler. By virtue of the fact that the write requires fewer cycles to complete than would a traditional conditional statement and the elimination of pipeline flushes resulting from mispredicted branches, this coding improves efficiency. An additional benefit is improved code density resulting in fewer instruction cache misses. Because the alternative unused portion is not cached during normal operations, a number of instructions cached which are actually used during such operations are likely to be increased. The code is also shorter as the handling of the rare case has been removed from the normal code and relegated to the signal handler. While it is recognized that invocation of the signal handler requires significantly longer than resolution of a traditional mispredicted branch, the aggregate savings and improved efficiency for branches which are seldom or never taken in the course of normal operations is substantial.

While in the above embodiment x is used as a positive offset to the pointer, one of ordinary skill in the art will understand that the unprotected page may be allocated from a higher address range than the protected page and addresses of the form "pointer-x" are within the scope and contemplation of the invention. More generally, address of the form "pointer+f(x)" allows this technique to be applied even where the range of x would otherwise make use of the more restrictive "pointer+x" impractical. Additionally, the pointer could be defined to point to an address within the protected page. This would be useful when, e.g., x must be greater than zero. If the pointer is defined to point to the highest address in the protected page, an offset of zero will invoke the signal handler.

Although the shown embodiment has only a single protected page and a single unprotected page with the unprotected page residing in numerically lower address space than the protected page, varying the order and number of the allocated protected page(s) and unprotected page(s) is also within the scope and contemplation of the invention. Finally, allocation of additional unprotected pages and appropriately defining the pointer to simplify the function f(x) is envisioned. For example, where the range of x is, e.g., two memory pages, allocation of two unprotected pages with the pointer defined to point to the address most distant from the protected page allows use of the simple function f(x)=x for the offset to the pointer. It should also be clear that implementations of a particular range for x (e.g., x>0 and x≦3) can be implemented by iteratively applying the above-described method to x>0 and x≦3 with either corresponding operation falling within the protected page invoking the signal handler.

Figure 6A:
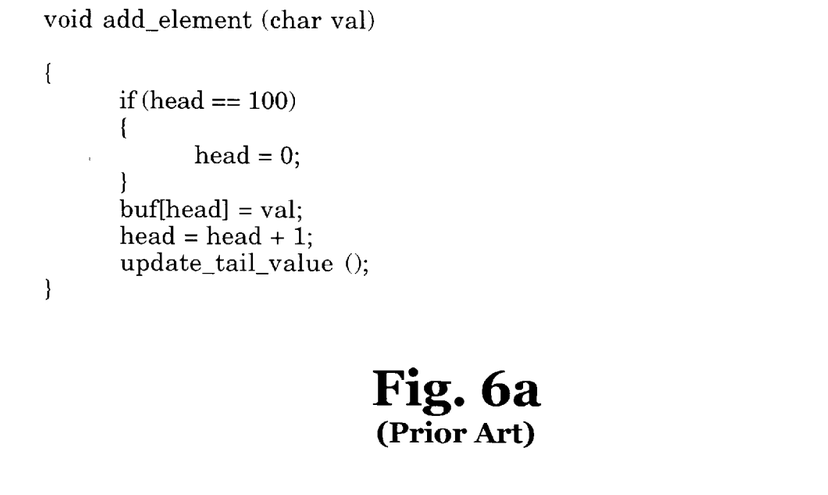
FIG. 6a shows a portion of a prior art coding of a cyclic buffer.
Figure 6B:
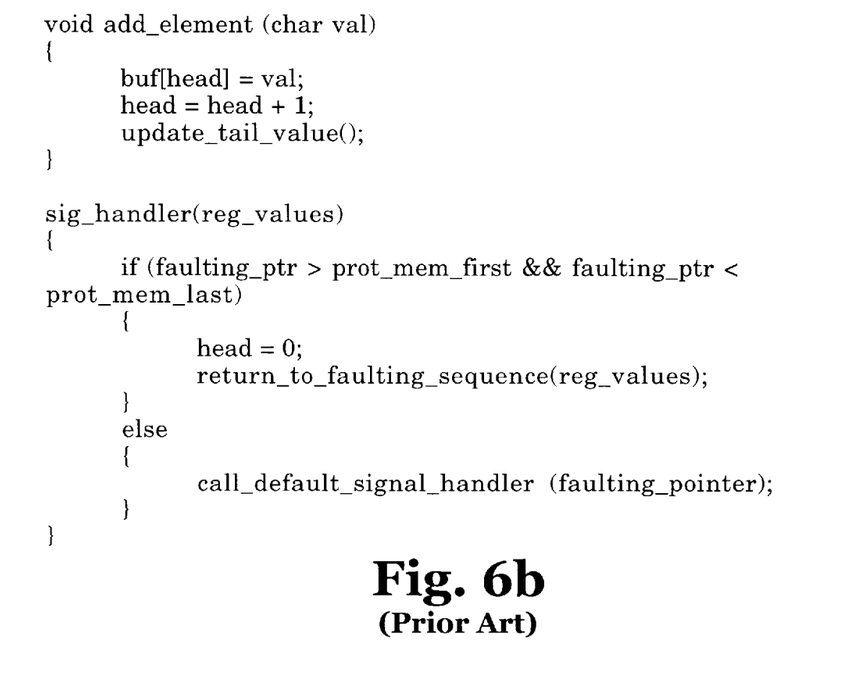
FIG. 6b shows a portion of a coding of the cyclic buffer of FIG. 6a in accordance with one embodiment of the invention.

In a second embodiment of the invention, the operation "replacing" the conditional statement may be one existing in the original code. In such cases, the performance improvement over the prior art is even more dramatic. FIG. 6a shows a prior art coding of a cyclic buffer susceptible to implementation using this second embodiment of the invention. FIG. 6b shows the recoding of the cyclic buffer of FIG. 6a in accordance with the second embodiment of the invention. In this embodiment, the cyclic buffer would be located in the last 100 units (bytes, words, etc.) of the unprotected page 39 shown in FIG. 2. This embodiment requires the signal handler return to the function that caused the faulting sequences. This is because in the implementation of a cyclic buffer, the code remains relevant even though the "end" of the buffer is reached, e.g., pointer is reset to the beginning of the buffer such that the oldest entries in the buffer are replaced and no buffer overflow occurs. Other examples in which the faulting code remains relevant will occur to those of ordinary skill in the art.

In the foregoing specification, the invention has been described with reference to specific embodiments thereof. It will however be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

What is claimed is:

1. A computer-implemented method to reduce conditional statements in a coded program comprising the steps of:

allocating from a memory a protected page of memory and an unprotected page of memory, the protected page adjacent to the unprotected page;

defining a pointer to point to a first location in the memory; and executing a first instruction effecting a second location that is the first location modified by a function of a conditional value, instead of a conditional statement.

2. The method of claim 1 further comprising the steps of:

executing the coded program if the second location is within the unprotected page;

invoking a signal handler if the second location is within the protected page; and executing an alternative sequence of code if the signal handler is invoked.

3. The method of claim 2 wherein the protected page is write protected and the first instruction is a write instruction.

4. The method of claim 2 wherein the protected page is read protected and the first instruction is a read.

5. The method of claim 2 wherein the first location is in the unprotected page a critical value distant from the protected page.

6. The method of claim 2 wherein the function is f(x)=x.

7. A computer system for executing a sequence of code comprising:

a bus;

a CPU coupled to the bus;

a memory coupled to the bus, the memory having at least two pages, at least one page being unprotected and at least one adjacent page being protected;

a pointer defined to point to an address in memory a critical value distant from a protected address;

the sequence of code affects an address of the pointer offset by a function of a conditional value; and a signal handler residing in the memory invoked when the operation effects the protected page.

8. The system of claim 7 wherein the function is f(x)=x.

9. The system of claim 7 further comprising a cache wherein at least one of the protected page and the unprotected page are cacheable.

10. An apparatus comprising:

a memory;

an allocation circuit coupled to the memory which allocates a protected page and an unprotected page contiguous in the memory;

a pointer-defining circuit which defines a pointer to a first address in the memory;

an execution unit that executes transactions with the memory at a second address equal to the first address modified by a function of a conditional value;

an invocation circuit that invokes a signal handler if the second address is within the protected page.

11. The apparatus of claim 10 wherein the function is f(x)=x.

12. The apparatus of claim 10 wherein the allocation circuit allocates the protected pages as one of read protected, write protected, and fully protected.

13. An apparatus which reduces conditional statement in a code sequence comprising:

means for allocating a protected page of memory and an unprotected page of memory;

means for defining a pointer to an address in memory;

means for executing a memory transaction between a memory and a processor at an address of a pointer offset by a function of a conditional value; and means for invoking a signal handler when the memory transaction effects the protected page.

* * * * *